May 9, 1939.　　A. M. ROSSMAN　　2,157,928
ELECTRIC LOCOMOTIVE
Filed Dec. 26, 1935　　3 Sheets-Sheet 1

INVENTOR:
ALLEN M. ROSSMAN

BY: C.T. Parker

ATTORNEY

FIG.3

May 9, 1939.  A. M. ROSSMAN  2,157,928
ELECTRIC LOCOMOTIVE
Filed Dec. 26, 1935  3 Sheets-Sheet 3

INVENTOR:
ALLEN M. ROSSMAN
BY: C. T. Parker
ATTORNEY

Patented May 9, 1939

2,157,928

UNITED STATES PATENT OFFICE 2,157,928

ELECTRIC LOCOMOTIVE

Allen M. Rossman, Wilmette, Ill.

Application December 26, 1935, Serial No. 56,146

19 Claims. (Cl. 172—274)

The present invention relates generally to electric traction and more particularly to a new system of propulsion for electric locomotives and the like, which can be adapted to operate efficiently on alternating current energy of any commercial frequency.

In the present state of the art, alternating current systems of railway electrification are subject to one or more of the following disadvantages:

1. Impracticability of using energy at the usual commercial frequencies of 60 or 50 cycles, and therefore, requiring either frequency converter substations or separate generating equipment.

2. Lack of flexibility, providing only two to four economical running speeds.

3. High losses in resistors and hence low efficiency.

4. Excessive weight and cost of locomotives.

5. Extremely complicated system of propulsion, employing electrical machines of unusual and special construction.

The principal object of the present invention is to provide an electric locomotive of practical design, which can be operated from a single phase, 60 cycle or 50 cycle trolley.

Another object relates to the provision of an electric locomotive capable of carrying a high tractive effort at high speeds.

Another object is to provide an induction motor driven locomotive having a satisfactory number of economical operating speeds.

A further object relates to the provision of an electric locomotive having traction motors and control equipment of well known and proven types, adaptable to any commercial frequency.

Still another object relates to minimizing the cost and weight of equipment consistent with the results obtained.

Another object has to do with the provision of a system of speed control for alternating current motors which utilizes the range of the auxiliary control equipment several times in accelerating the motors over their speed range.

Another object relates to a method for accelerating induction motors from zero speed up to any desired super-synchronous speed, under full torque during acceleration.

Further objects will be made apparent to those skilled in the art, by the present disclosure.

The system of propulsion disclosed herein draws single phase energy which is converted to 3 phase energy on the locomotive for use in the traction motors, which are simply wound rotor type induction motors, each motor having but one set of three secondary collector rings.

The system of speed control has as its basis, a novel system of controlling the speeds of wound rotor type induction motors by controlling the frequency of the energy in the secondary windings of the motors, shown and described in my U. S. Pat. No. 2,087,782, dated July 20, 1937, to which reference is hereby specifically made. The speed control system disclosed in the present disclosure, can be adapted to provide at least 15 evenly spaced, economical running speeds, and any desired number of intermediate accelerating steps. It centers in two or more 3-unit motor generator sets, which, because of their manner of use, are so small that they can be placed side by side on opposite sides of a locomotive cab and still leave ample aisle space between them.

The characteristics and method of use of the traction motors and control are such that they will permit the locomotive to deliver its maximum tractive effort throughout its speed range, including that portion of the range in which the traction motors pass through the speed zone which embraces their synchronous speed.

A small direct-current exciter is the only commutator type machine required; all other electrical machines are induction or synchronous type machines.

The locomotive is inherently regenerative and regenerative braking is available over the entire speed range.

Energy flow between trolley wire and locomotive is at all speeds approximately proportional to the product of speed times tractive effort.

I will now describe the construction and method of operation of an embodiment of the present invention in which reference will be had to the following drawings which are appended to and made a part of this disclosure.

Like reference numerals refer to like parts throughout the specification and drawings.

Figure 1:
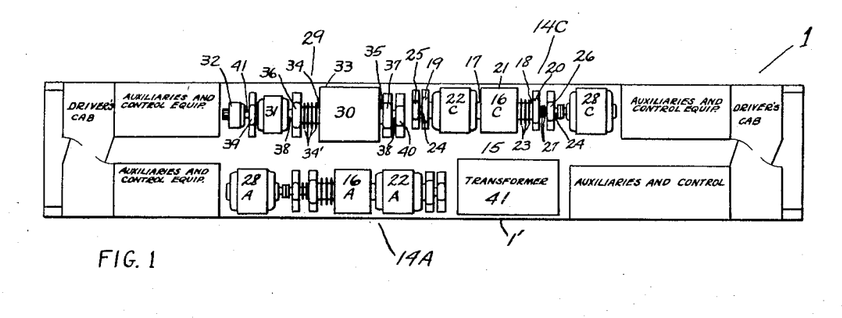
Figure 1 is a diagram in plan of the arrangement of the major pieces of equipment in the locomotive.
Figure 2:
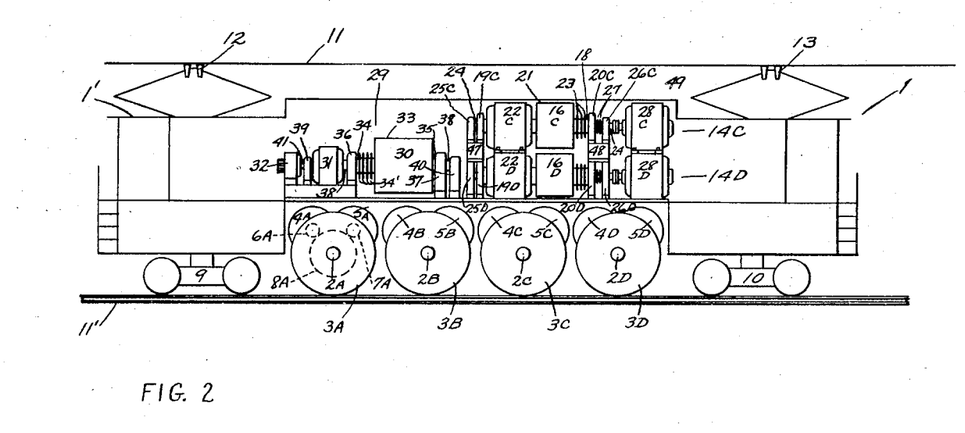
Figure 2 is a similar diagram but in elevation.

In Figures 1 and 2, the locomotive is shown equipped with four driving axles 2A, 2B, 2C, 2D, on which are wheels 3, each of the axles being driven by a pair of twin motors 4, 5 respectively. As this arrangement of motors is well known to those skilled in the art, as well as the method of gearing to the axles by pinions 6, 7, meshing with a single gear 8, coaxial to and connected with the axle 2, these details are, for the sake of simplicity, merely indicated by outline.

A pony or guiding truck 9, 10 is shown at each end respectively of the locomotive, which is supported on a track 11'.

On each end of the roof of the locomotive cab 1' is a current collector 12, 13 respectively, adapted to coact with the trolley wire 11.

For each pair of twin motors is provided a control motor generator set 14A, 14B, 14C, 14D respectively. The size of the control sets 14 is such that two can be placed on each side of the aisle 15, each pair arranged in two tiers, one set above the other.

Each control set 14, is in itself, an adjustable ratio frequency converter. It comprises three machines, one of which 16 is a machine of a type known to those skilled in the art, in which the frame member usually known as the stator on ordinary machines, is rotatably mounted on bearings so that it, as well as the rotor, is independently rotatable.

Inasmuch as the construction of this type of machine has been described in my previously mentioned copending application as well as in U. S. Pat. No. 2,061,893, issued November 24, 1936, and U. S. Patent No. 1,828,943, dated October 27, 1931, a brief description will suffice here.

The rotatable frame member 21 is provided with a pair of hollow trunnions 17, 18 affixed to each end thereof, one of the trunnions 17 being supported in a pedestal bearing 19, the other in a second pedestal bearing 20. The first-mentioned trunnion is elongated to provide a mounting for the rotor member of the second machine 22 of the control set. The latter machine, the frame of which is stationary, therefore is effectively coupled with, and is adapted to control the rotation of, the rotatable frame member 21.

The other trunnion 18 forms a support for a set of collector rings 23, which are connected to the armature winding disposed within the rotatable frame member.

The rotor member is mounted on a shaft 24 which is coaxial to the trunnions and extends through them to bearings 25, 26, at each end respectively. On the rotor shaft are disposed collector rings 27 for conducting direct current excitation to the field windings of the machine 16 which, as will be seen later, is preferably of the synchronous type.

Coupled to the rotor shaft 24 is a third machine 28. It is now evident that one of the auxiliary machines 22 controls the speed and direction of one of the rotatable members 21, while the other auxiliary machine 28 controls the other member.

Another piece of equipment in the locomotive is a phase converter set 29, consisting of a phase converter 30, an auxiliary machine 31, and a small direct current exciter 32, although the latter machine could be driven by a separate motor if so desired. Although the phase converter could be of the conventional type, well known to those skilled in the art, I prefer to employ the novel phase converter disclosed in my copending U. S. application, Serial No. 15,173, filed April 8, 1935, to which specific reference is hereby made.

The phase converter shown in Figures 1 and 2 is electrically of conventional type as will be explained later. Mechanically, however, it is unusual in that it is a machine of the rotatable frame type, similar to the synchronous machines 16 of the control M-G sets 14. The frame 33 is supported by a pair of hollow trunnions 34, 35 which are carried in bearings 36, 37 respectively. On one of the trunnions is mounted a set of four collector rings 34', which are connected to the armature windings of the converter. As the machine illustrated is of the squirrel cage type, there are no excitation collector rings, although this machine could well be of the synchronous type.

The rotor shaft 38 of the converter is disposed concentric to and within the hollow trunnions 34, 35, and is supported in bearings 39, 40, at each end. The rotor member of the auxiliary machine 31 is mounted on an elongation of this shaft 38 between the bearings 36, 39. Hence, the auxiliary machine, which is of the conventional stationary frame type, controls the speed of rotation of the rotor shaft. A reduced diameter shaft extension 41 carries the armature of the exciter 32.

The purpose of the rotatable frame in this machine is to provide a means for obtaining increased capacity from a core of given dimensions over that obtainable with a conventional machine, in order to conserve space and weight. The increase in capacity is explained as follows:

It is well-known in the art of electrical machine design that the higher the peripheral speed of the rotor of an electrical machine of given core dimensions the greater is the capacity of that machine. The practice is therefore generally followed in designing an electrical machine, to determine the rotor diameter by the maximum permissible speed of that member. This speed is limited by the amount of centrifugal force that it is practicable to counteract by bracing the windings and anchoring the pole pieces and other parts of the rotating member.

A more fundamental factor in determining the capacity of a machine than the absolute speed of the rotor, is the actual relative velocity between the rotor member and the frame member, usually known as the stator. Hence, if the rotor member be operating at its maximum permissible peripheral velocity in one direction of rotation, the relative velocity between the two members can be greatly increased, if the frame member be likewise rotated at its maximum permissible velocity but in the opposite direction, thereby resulting in a corresponding increase in the capacity of the machine.

Take, for example, a machine, the rotor of which is designed to operate at 720 R. P. M. If the frame of this machine be rotated at 480 R. P. M. in the opposite direction, the relative speed between the rotor and frame will be increased from 720 R. P. M. to 1200 R. P. M., resulting in an increase in capacity of 67%.

The function of the auxiliary machine 31 is to hold the rotor shaft 38 at its normal speed in one direction, while the converter 30 is connected to the supply of alternating current in suitable phase rotation so that the frame member 33 runs in the opposite direction.

As the phase converter normally operates without substantial external mechanical load, the frame member merely idles at a constant speed which is equal to the normal speed of the converter, as determined by the number of electrical poles and the frequency of the supply, minus the speed of the rotor member.

Hence, the auxiliary machine 31 need not be designed to balance or resist the torque of the converter 30, but need develop only a torque sufficient to overcome the friction and windage of the element to which it is coupled. The auxiliary machine is also preferably used as a starting motor to bring the rotor member up to normal speed. The other member 33 can then be accelerated by applying voltage to the converter windings, as explained in more detail in my above-mentioned application.

Although a phase converter of conventional design would suffice, it would require more space in the locomotive. By this novel type of converter, I am enabled to obtain an arrangement of equipment in the locomotive such as is shown in Figures 1 and 2, which uses the available space to good advantage.

The M-G sets are arranged in two tiers, two of the sets 14A, 14C being disposed above the other two sets 14B, 14D respectively, the pedestal bearings 19C, 25C at the end of the upper set 14C being carried on a base block 47 which rests on the pedestals 19D, 25D of the lower M-G set 14D. Likewise, the pedestal bearings 20C, 26C at the other end of the upper synchronous machine 16C are supported on a base block 48 which rests on the pedestals 20D, 26D of the lower M-G set 14D. The stator frames of the two end machines 22C, 28C are also supported on the stator frames of the lower machines 22D, 28D. By locating the converter 29 and one pair of control M-G sets 14C, 14D along one side of the cab, the two M-G sets disposed one above the other, and the other pair of M-G sets 14A, 14B, one above the other along the other side of the locomotive, opposite to the converter, and the transformer 41 opposite the pair of M-G sets 14C, 14D, a suitable aisle 15 is provided down the center of the locomotive, and the weight of the above-mentioned machines is concentrated above the driving axles.

Figure 3:
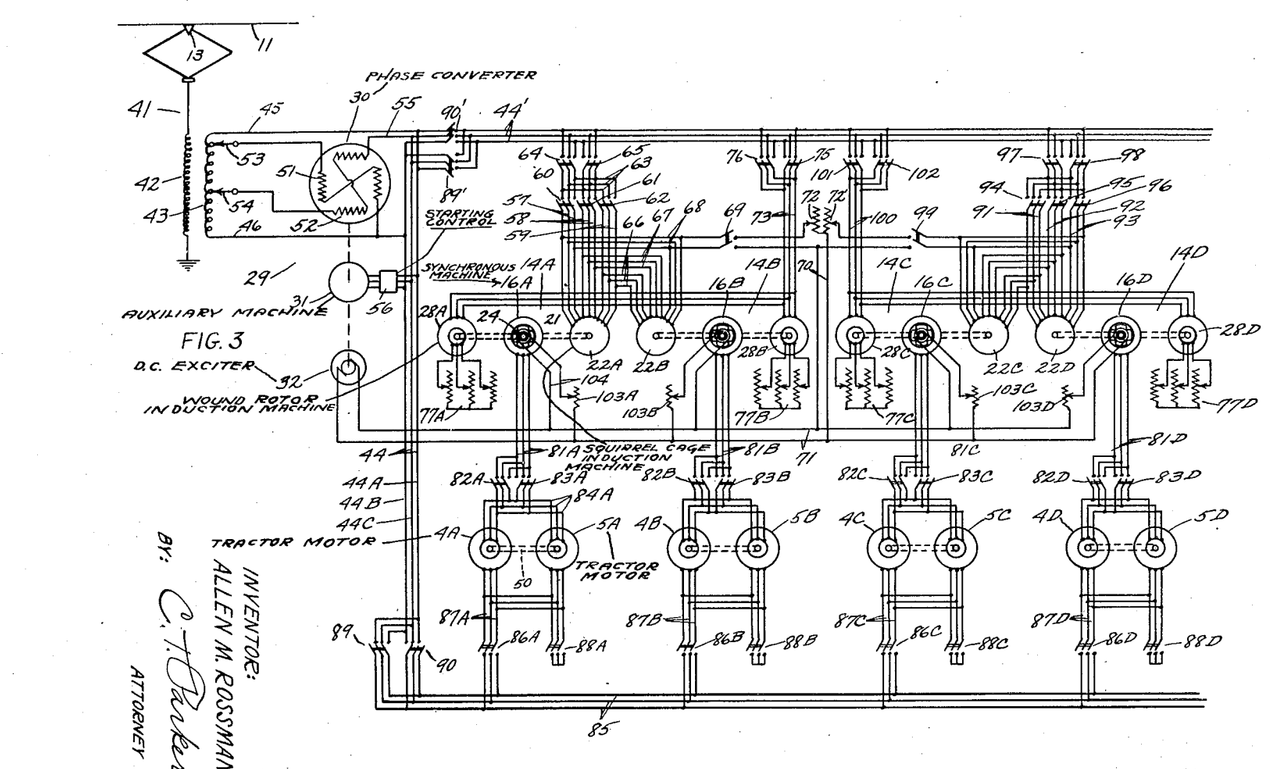
Figure 3 is a wiring diagram of the main circuits in the locomotive.

Referring now to Figure 3, the primary winding 42 of the single phase transformer 41 is connected between the current collector 13, which contacts the trolley wire 11 and the ground connection to the frame of the locomotive in the usual manner. Single phase power is supplied to the trolley wire and rails from a power system as is known by those skilled in the art. The secondary winding 43 is connected to two conductors 44A, 44B of a three phase bus by a pair of conductors 45, 46.

The phase converter 30 can be either a synchronous or induction type machine. Although a squirrel cage induction machine has the advantage of simplicity, the synchronous type offers the possibility of power factor correction. For a complete description of this machine, reference is made to an article entitled "Single-Phase Loads from Polyphase Systems," by B. G. Lamme, Electrical Journal, June, 1915, page 261.

A short explanation of that machine will suffice here. The converter 30 is wound with two windings 51, 52, in 90-degree relation to each other. One of the windings 51 is connected across the single phase secondary winding 43 of the transformer, with a tap changer 53 or other suitable device for adjusting the voltage on the winding. The other winding 52 is connected to the third phase conductor 44C of the bus by a conductor 55 and to the mid-point of the transformer through an adjustable voltage tap changer 54. The adjustable tap connectors 53, 54 on the transformer permit voltage changes to be made under different loading conditions, to maintain substantially balanced three-phase voltages.

The auxiliary machine 31 is connected to the bus 44 through a starting controller 56 which contains suitable equipment for starting and accelerating one of the rotatable members of the converter on single phase power from the transformer. After the converter is brought up to its normal operating speed, the auxiliary machine 31 holds the absolute speeds of the rotatable members at suitable values.

Each of the four M-G sets 14A, 14B, 14C, 14D, comprises the adjustable frequency machine 16, which is of the synchronous type, a wound rotor type induction machine 28 coupled to the rotor shaft 24, and a multi-speed, squirrel cage induction machine 22 coupled to the rotatable frame member 21.

The multi-speed induction machine 22A is indicated as having three separate three-phase windings, each speed of the machine being obtained by selectively energizing one of the windings. Although I have thus indicated the winding arrangements for purposes of simplicity and clarity, it is to be understood that any of the usual methods of reconnecting a winding to obtain two speeds may be employed if so desired; furthermore, although three speeds are used as illustration in this embodiment, other numbers of speeds may be used in other embodiments of this system of speed control.

Each of the three windings is connected by a set of leads 57, 58, 59 respectively and switches 60, 61, 62, respectively to an intermediate bus 63. This bus can be connected to the three phase bus 44' by a pair of reversing switches 64, 65, by means of which the phase rotation in any of the windings and hence the direction of rotation of the induction machine 22A can be controlled.

The corresponding induction machine 22B of the second M-G set 14B is similarly indicated as a three winding, three speed machine by the three sets of leads 66, 67, 68, which are connected in multiple with the three windings of the first mentioned induction machine 22A. Hence, it is evident that the speed control switches 60, 61, 62, as well as the reversing switches 64, 65, control both multi-speed motors 22A, 22B, simultaneously.

Provision is made for supplying direct current to one of the windings of each of the multi-speed induction motors from a suitable source of direct current by means of a switch 69, through an adjustable rheostat 72, and leads 70, connected to a d.-c. bus 71. The d.-c. bus is supplied from the exciter 32. As is known to those skilled in the art, direct current flowing in the windings of an induction motor has the effect of braking the motor and locking its rotor and stator together. The purpose of holding these machines stationary will be explained later.

The wound rotor induction machines 28A, 28B of the first two M-G sets 14A, 14B, likewise have their primary windings connected in multiple to a set of leads 73 which are connected in turn to the bus 44' by reversing switches 75, 76, by means of which the direction of rotation of the machines can be controlled.

Each of the wound rotor induction machines has an independent control rheostat 77A, 77B connected to the secondary windings of the respective machine.

The armature winding of each of the adjustable frequency synchronous machines 16 is connected by a set of leads 81 and a pair of reversing switches 82, 83 to an independent secondary bus 84, to which bus the secondary windings of the pair of twin wound rotor induction type traction motors 4, 5 are connected in multiple. Hence, it is evident that each synchronous machine controls the frequency of the energy in the secondary windings of the respective pair of traction motors. The mechanical tie between the traction motors is indicated by broken lines 50, representing any mechanical connection, such as the gears 6, 7, 8 shown in Figure 2.

The primary windings of each pair of traction motors are likewise connected in parallel and to the traction motor primary bus 85 by leads 87 and a switch 86. The primary windings of each pair of traction motors 4, 5, can be short-circuited by a switch 88.

The traction motor primary bus 85 is selectively connected by a pair of reversing switches 89, 90 respectively to the main bus 44 for either direction of phase rotation. Another pair of reversing switches 89', 90' is provided for connecting the M-G set bus 44' to the main bus 44 in either direction of phase rotation.

The induction machines 22C, 22D of the other two M-G sets are connected in parallel to the bus 44' by means of leads 91, 92, 93, the respective speed control switches 94, 95, 96, and a pair of reversing switches 97, 98.

One of the windings of each of the induction machines 22C, 22D are connected in parallel to the d.-c. bus 71, through a d.-c. switch 99, an adjustable rheostat 72 and leads 70.

The wound rotor induction machines 28C, 28D of the second pair of M-G sets are likewise connected in parallel to the bus 44' through leads 100 and a pair of reversing switches 101, 102. An adjustable rheostat 77C, 77D is connected in series with the secondary winding of each motor respectively.

The field windings of each synchronous machine 16 are excited by direct current supplied from the d.-c. bus 71 through an adjustable rheostat 103 and wires 104. By means of this rheostat, the voltage and power factor of the circuit, including the synchronous machine 16 and the secondary windings of the traction motors 4, 5, can be controlled. Furthermore, strengthening the field of the synchronous machine increases the synchronizing torque between the latter machine and the traction motors and hence the maximum pull-out torque of the traction motors.

It is well known that when the speed of an induction motor is controlled by control of the frequency of the energy in either its primary or its secondary winding by means of a synchronous machine operated at adjustable speeds, the synchronizing torque which tends to hold the two machines in synchronism drops off as the frequency of the energy in the interconnecting circuit decreases. However, the synchronizing torque decreases very little as the frequency decreases from normal value to half that value, that is, not more than 10–20%. It is in the lower half of the frequency range that the torque drops rapidly.

Therefore, in order to obtain a satisfactory torque on the synchronous machine tending to hold it in synchronism with the traction motors throughout the entire speed range of the motors, and hence derive the maximum benefit from the traction motors and control machines, the novel method of speed control which is described herein has been devised so that the frequency of the energy in the circuit, comprising the synchronous machine 16, interconnecting leads 81, and the secondary windings of the traction motors, never falls below half normal frequency.

The complete range of speed control of the traction motors is divided into three parts. In the first part of the range, the primary windings of the traction motors are connected to the power supply, the frequency of which is of course constant. The frequency of the energy in the secondary windings of the traction motors is then adjustably decreased from full to half the frequency of the supply, thereby accelerating the motors to half their rated synchronous speeds.

Now in the second part of the speed range, the primary windings are disconnected from the power supply and short-circuited, while the secondary windings are reversed in phase rotation with respect to the synchronous machine. Whereas in the first part of the speed range, the flow of power was out from the secondary windings, in the second part of the range, the direction of power flow is into the secondary windings. In other words, the secondary windings now actually operate as primary windings, the heretofore primary windings being short-circuited. However, in order to avoid confusion, throughout this explanation and in the claims which follow, I will always refer to the winding which is connected to the power supply during part of the speed range, as the primary winding, and that winding connected to the synchronous machine as the secondary winding.

In the second part of the speed range, the frequency of the energy flowing into the secondary winding is adjustably increased from half the supply frequency to a value appreciably higher than the supply frequency.

For the third part of the speed range, the primary winding is again connected to the power supply while the secondary frequency is adjustably increased from a value equal to the maximum value attained in the second part of the range minus the power supply frequency, to any suitable maximum frequency. In the third part of the speed range therefore, the traction motors are running above synchronism at supersynchronous speeds, and power flows into the primary windings from the line, and into the secondary windings from the synchronous machines.

As each change in connections of the machines necessitates a momentary interruption in torque, it is preferable to change connections on but a part of the motors at a time, during which change the remainder of the motors maintain the tractive effort of the locomotive, or at least a corresponding percentage of its value before the switching occurs. To carry out this requirement, the switching changes in the present embodiment are effected on half the M-G sets at a time, as indicated by the parallel connection of the two wound rotor induction machines 28A, 28B, of the first two M-G sets, to the single pair of reversing switches 75, 76, and similarly the simultaneous control of the other two wound rotor induction machines 28C, 28D, by means of the other pair of reversing switches 101, 102.

Likewise, the multi-speed induction machines are controlled in two groups, one group comprising the machines 22A, 22B of the first two M-G sets 14A, 14B, controlled in parallel by a common set of speed changing switches 60, 61, 62 and reversing switches 64, 65. The other two multi-speed machines 22C, 22D are also controlled in multiple by a common set of switches 94, 95, 96, 97, 9[.

The system herein described is not confined to the number of M-G sets and traction motors shown, although it may now be evident that there are certain requirements which must be met. There must be at least two M-G sets in order to hold tractive effort on the locomotive during switching changes. At least, there must be two multi-speed induction motors so that one of them can be in connection at all times.

Another requirement is that any traction motors which are paralleled on both primary and secondary sides should also have a positive mechanical tie between them as well. That is to say, traction motor which are connected to different driving axles, which axles are not geared together or connected by side rods or the like, should not have both their primary windings and their secondary windings connected respectively in parallel. The reason for this is that when wound rotor induction motors are connected in parallel on both primary and secondary sides, they operate in synchronism with each other as is well known to those skilled in the art. Hence, if motors so connected electrically, are coupled to different driving axles, any difference in diameter of the driving wheels on those axles will tend to cause a difference in speed between the motors, but as the motors must all run in synchronism, some of the driving wheels must slip on the rails and some of the traction motors will run as generators, their torque subtracting from the pulling power of the locomotive.

As each pair of twin motors 4A, 5A, etc. is geared to one axle, there is no tendency for them to run at different speeds and so they may be connected in parallel to the same M-G set. As four such driving axles are shown and there are no mechanical ties between them, the system requires four M-G sets. Four small M-G sets, however, are deemed to be preferable to two larger sets plus side rods or other mechanical tie between axles.

With this arrangement any slight differences between the speeds of the axles is reflected back to the synchronous machine 16, which run at slightly different relative speeds between rotor and frame members. This difference can easily be compensated for by slight adjustments in the amount of resistance 77 in each of the secondary circuits of the wound rotor machines 28 of the M-G sets.

I will now explain in detail the operation of the novel system of speed control.

With the locomotive at standstill but in readiness to start, three phase power must of course be available at the bus 44, hence the phase converter must be operating normally. One switch 90, 90' of each pair of reversing switches must be closed, depending on which direction the locomotive is to move, thus energizing the M-G set bus 44' and the primary bus 85, and, by closing the primary switches 86, the primary windings of all traction motors 4, 5 are energized. As the traction motors are now stationary, the frequency of the voltage induced in their secondary windings is equal to the frequency of the power supply. Therefore, in order to connect the synchronous machine 16 to the secondary windings of the traction motors, the frequency of its generated voltage should also be equal to the supply frequency.

Assuming the supply frequency to be 60 cycles, if the synchronous machine 16 has 6 poles, the relative speed between rotor member and frame member at the point of starting should be 1200 R. P. M.

For this illustration, let the wound rotor induction machine 28 have 6 poles and the multi-speed induction machine 22 have three pole-groupings of 12, 18 and 36 poles respectively.

By closing the proper switches 75 and 101 and adjusting the rheostats 77, the wound rotor induction machines bring the rotor members of the several synchronous machines 16 up to approximately 1200 R. P. M. and the synchronous machines may be connected to the secondary windings of the traction motors by closing the proper switches 83, after which the field excitation of the synchronous machines can be adjusted to suitable values by means of the field rheostats 103. Now let the multi-speed induction motors be brought up to their lowest speed of approximately 200 R. P. M. by first inserting a high resistance in the secondary control rheostats 77, or preferably, opening these secondary circuits entirely, assuming the rheostats to have an "open" position, or infinite resistance, and closing the proper speed selecting switches 60, 96 and closing the switch 64, 96 to select the proper direction of rotation, in the same direction as that of the motor members.

As the induction machines 22 accelerate to their lowest speed of 200 R. P. M., the wound rotor machines 28 are brought up to 1400 R. P. M., as the synchronous machines 16 are fixed at a relative speed of 1200 R. P. M. by the 60 cycle energy flowing into their armature windings rom the secondary windings of the traction motions 4, 5, at which point the locomotive is ready to start.

Now by adjusting the rheostats 77, gradually decreasing their resistance, the wound rotor machines 28 are brought from 1400 R. P. M. down to approximately 1200 R. P. M. during which operation they operate as induction generators. As the multi-speed machines 22 are fixed at approximately 200 R. P. M., at the end of this operation the relative speed between the rotor and frame members of the synchronous machines 16 has been reduced to 1200 minus 200 or 1000 R. P. M., with a corresponding decrease in frequency in the interconnecting circuit 81 to 50 cycles. By this means the traction motors have been accelerated to one-sixth of their 60 cycle synchronous speed, or, assuming the traction motors each to have 12 poles, they are now operating at 100 R. P. M.

Power is now flowing from the primary bus 85 at sixty cycles into the primary windings of the traction motors through the leads 87, one-sixth of which is used to run the traction motors, while the other five-sixths (neglecting losses) flows at 50 cycles from the secondary windings, through the leads 81, into the armature windings of the synchronous machines 16. The latter machines therefore operate as motors at a relative speed of 1000 R. P. M., the rotor members driving the wound rotor induction machines 28 as generators at 1200 R. P. M. while the multi-speed induction machines 22, operating as motors, drive the frame members at 200 R. P. M.; thereby supplying the difference in speed between the 1200 R. P. M. of the wound rotor induction machines 28 and the relative speed of 1000 R. P. M. between the members of the synchronous machines 16.

The locomotive is now running at its first economical running speed, which in this case is one-fifteenth, or 6.7%, of its maximum speed. It is an economical speed as no power is wasted in resistors afer the resistance in the rheostats 77 is cut out. The only power that is drawn from the trolley 11 is that converted into mechanical energy by the traction motors plus the losses in the machines themselves. There is, however, a large amount of power circulating from the bus, through the traction motors and back to the bus by way of M-G sets.

Now to accelerate further, there must be some switching of speed connections, half the motors at a time. First the rheostat 77A, 77B are set in the "open" position and the multi-speed machines are connected on their 18-pole (400 R. P. M.) windings by opening the lowest speed switch 60 and closing the next switch 61. As these machines rapidly accelerate to 400 R. P. M., the wound rotor machines 28A, 28B are brought up to 1000+400 R. P. M. or 1400 R. P. M. once more. Sufficient resistance is then inserted into the rheostats 77A, 77B to cause the first group of traction motors 4A, 5A, 4B, 5B to assume load while the switching operation is being carried out on the second group of motors 4C, 5C, 4D, 5D, which have maintained torque on their driving axles during the above described switching operation on the first group of motors.

The second group of machines is switched in a manner similar to the above described operation. First the rheostats 77C, 77D are set in the open position, the multi-speed machines 22C, 22D are then connected on their 18-pole (400 R. P. M.) windings by opening the low speed switch 96 and closing the intermediate speed switch 95.

With all multi-speed induction machines 22 running at approximately 400 R. P. M. and all wound rotor machines 28 running at approximately 1400 R. P. M., the locomotive is again accelerated to the next economical running speed of 13.3% of the maximum speed by gradually cutting out the resistance in the several rheostats 77 simultaneously, thereby decelerating the wound rotor induction machines 28 down to approximate 1200 R. P. M. The relative speed between the two members of each of the synchronous machines 16 is thus reduced to 800 R. P. M. so that the frequency of the energy in the secondary windings of the traction motors has been reduced to 40 cycles.

The third economical operating speed of the locomotive is attained by the method described above for accelerating from the first to the second speed. On the third speed connection, the multi-speed induction machines 22 are connected on their highest speed connection by opening the intermediate speed switches 61, 95 and closing the high speed switch 62, 94, and therefore operate at substantially 600 R. P. M. As the wound rotor induction machines 28 operate at 1200 R. P. M. in the same direction, the relative speed between rotor and frame members of each of the synchronous machines 16 is 600 R. P. M., which corresponds to 30 cycles in the interconnecting circuit. This frequency, which is half the value of that of the power supply, is the minimum to which it is desirable to extend the control because, as heretofore stated, the synchronous tie between the synchronous machine 16 and the traction motors begins to decrease in its effect rapidly as the frequency in the interconnecting circuit is further decreased, and the undesirable result of a decrease in this synchronizing torque is a corresponding decrease in the maximum rate of acceleration of the locomotive.

At this point, therefore, a transition in connections of the first half of the motors is made. The transition has as its object the change-over from control of the frequency of the energy flowing from the secondary winding of each traction motor while energy is supplied from the bus to the primary winding, to control of the frequency of the energy supplied to one of the windings with the other winding short-circuited. The transition could have been made when the frequency of the energy flowing from the secondary winding was at a greater value, say 40 cycles, by short-circuiting the primary winding and then re-adjusting the relative speed between the rotating members of the synchronous machine to give 20 cycles, at which frequency the power could have been supplied to the secondary winding. Or, on the other hand, the transition could be delayed until the motors had accelerated to a higher speed when the frequency of the energy flowing from the secondary windings had been reduced to 20 cycles, whereupon after transition the frequency of the power supplied by the synchronous machine would be necessarily 40 cycles. In any case, after the transition the frequency of the energy supplied by the synchronous machine must be equal to the frequency of the power supply minus the frequency of the energy flowing from the secondary winding just before transition. Hence, if the latter frequency be brought to half that of the power supply, or 30 cycles, no adjustment need be made during transition, a mere reversal of phase rotation being all that is required. The transition is made by opening the primary switches 86A, 86B, thereby disconnecting the primary windings of the traction motors 4A, 5A, 4B, 5B from the power supply. At the same time, the secondary windings are disconnected from the synchronous machines by opening the secondary switches 83A, 83B. The short-circuiting switches 88A, 88B, and also the other secondary switches 82A, 82B for reversed phase rotation are now closed, after which the traction motors operate at 30 cycles on the secondary windings on power which now flows from the synchronous machines 16, which now operate as synchronous generators. The wound rotor induction machines 28 now operate as motors instead of generators, while the multi-speed induction machines change from motoring to generating operation.

Now while the first half of the motors hold the tractive effort of the locomotive, the second half of the motors are put through a similar transition. The traction motors are disconnected by opening the primary and secondary switches 86C, 86D, 83C, 83D respectively, and then the short-circuiting switches 88C, 88D and the reverse phase rotation secondary switches 82C, 82D are closed and the transition is complete, and the locomotive is ready for reconnection on the next speed step, which consists in raising the frequency of the energy supplied to the traction motors from 30 cycles to 40 cycles.

As in previous steps, the secondary rheostats 77 of the first half of the equipment are set in the position of maximum resistance, which is preferably infinite resistance with the rheostats 65 in the "open" position. The multi-speed induction machines 22 are then switched to their intermediate speed of 400 R. P. M. by opening the high speed switch 62 and closing the intermediate speed switch 61. As the machines decelerate from approximately 600 R. P. M. to approximately 400 R. P. M., the wound rotor induction machines 28 are decelerated from approximately 1200 R. P. M. to about 1000 R. P. M., as the synchronous machines 16 maintain their 30 cycle relative speed of 600 R. P. M. Finally, sufficient resistance is inserted in the rheostats 77A, 77B to cause the first half of the traction motors 4A, 5A, 4B, 5B to assume the load, and the reconnection can then be made on the second half of the motors 4C, 5C, 4D, 5D in a similar manner.

After the transition is complete, the resistance in all rheostats 77 is gradually cut out, thereby accelerating the wound rotor induction machines 28 from 1000 R. P. M. to 1200 R. P. M. (minus the slip), which increases the frequency of the energy supplied to the traction motors from 30 cycles to 40 cycles, thereby accelerating them to 400 R. P. M. or 26.7% of the maximum speed.

Although for purposes of analysis, I have explained the transition and reconnection for the fourth step of the speed range, as taking place in two separate or independent operations, in practice these two operations can be combined by reconnecting the multi-speed induction machines 22 at the same time that the primary and secondary reconnection of the traction motors is being made. During the reconnection the rheostats 77 should be set in the "open" position so that the wound rotor induction machines 28 will not exert torque, resisting the change in speed of the multi-speed machines 22. After the latter machines have reached their new speed, the rheostats are adjusted to hold the torque of the first half of the motors while the second half are put through a combined transition and reconnection, after which all rheostats are then adjusted to cut out the resistance to accelerate the locomotive to the fourth operating speed.

A detailed explanation of the method of accelerating to the fifth speed of 33.3% of maximum is not necessary as it is similar to the others heretofore explained. In this step the speed of the multi-speed induction machines 22 is reduced to 200 R. P. M., and when the wound rotor induction machines have been accelerated, by means of the rheostats 77, to 1200 R. P. M., the frequency of the energy generated by the synchronous machine 16 becomes 50 cycles.

To attain the sixth step, means are necessary for bringing the multi-speed machines 22 to rest and holding them stationary or substantially stationary, the wound rotor machines 28 then accelerating once more from 1000 R. P. M. to 1200 R. P. M., thereby causing the synchronous machines to generate at 60 cycles.

Although there are several known methods of braking and holding the multi-speed machines stationary, I prefer to accomplish this result by energizing at least one of the windings of these machines with direct current, by closing the d.-c. switches 69, 99 after opening the a.-c. speed selecting switches. This method of braking an induction motor is known to those skilled in the art and needs no further explanation here than to say that the braking torque can be adjusted by adjusting the intensity of the direct current by means of the rheostats 72, 72'. Under direct current excitation the braking torque reaches a maximum value at a very low speed, approximately 2 or 3% of the normal rated speed. Hence, the machines 22 will thus be held nearly stationary, and the current required to do so is in the order of the value of full load alternating current in normal running operation, therefore forced ventilation of these machines is desirable.

With energy at 60 cycles supplied to the secondary windings of the traction motors, the primary windings being short-circuited, the motors will run at substantially 600 R. P. M. (less slip), which is 40% of the maximum speed under this system of control.

The seventh step of control involves increasing the last mentioned frequency from 60 cycles to 70 cycles. In this switching operation, the d.-c. switch 69 is opened and with the rheostats 77A, 77B open, the multi-speed induction motors are connected to their low speed windings but in the opposite direction of rotation to that heretofore taken. This is accomplished by opening the "forward" switch 64 and closing the "reverse" switch 65 and the low speed switch 60, then, by adjusting the rheostats 77A, 77B this group of traction motors 4A, 5A, 4B, 5B can be made to assume the load while a similar switching operation on the second group is accomplished, whereupon the multi-speed motors 22C, 22D are connected on their low speed windings but in the reverse direction through the reverse switch 97 and the low speed switch 96. By simultaneously but gradually cutting out all rheostats 77, the seventh running speed of 46.7% is attained.

On this running speed, the synchronous machines 16 supply 70 cycle power to the traction motors, at which frequency they operate at 700 R. P. M. (on the basis of 12-pole motors).

On this step, the multi-speed machines 22 having been reversed in direction of rotation, they now operate as motors instead of as generators. Hence, both induction machines 22, 28 now expend power upon the synchronous machine 16, which converts the mechanical power input to electrical power output at 70 cycles, and the rotor and frame of the synchronous machine now run in relatively opposite directions of rotation.

It is now to be noted that the traction motors have passed beyond their synchronous speed with respect to the frequency of the power supply; therefore their primary windings could now be reconnected to the supply bus and with power at 10 cycles supplied to their secondary windings they would then operate at super-synchronous speed. However, as has been stated hereinbefore, in order to obtain a synchronizing torque which approximates maximum normal value, the frequency in the interconnecting circuit between the synchronous machines 16 and traction motors 4, 5 should be about half the frequency of the power supply.

Hence, it is preferable to continue the acceleration by further increasing the frequency of the power supplied to the traction motors to 90 cycles or thereabouts before making the transition. It is not believed that a detailed analysis is necessary of the next two steps wherein the frequency is raised first to 80 cycles and then to 90 cycles as the method of switching is similar to that as heretofore given. Suffice it to say that the multi-speed motors are first connected on their intermediate speed windings to obtain a speed of 400 R. P. M. on the frame of the synchronous machine, which, added to the 1200 R. P. M. of the motor, gives a relative speed between members of 1600 R. P. M., resulting in a generated frequency of 80 cycles. On the ninth step the multi-speed machines are brought up to their maximum speed of 600 R. P. M. resulting in a relative speed of 1800 R. P. M. between rotor and frame which corresponds to 90 cycles on the assumption of a 6-pole synchronous machine.

Although it is not, of course, essential to carry the acceleration to any further extent, it is beneficial to so do, as the increased speed and hence greater power output can be obtained with no extra expense in capacity of the traction motors or machines in the M-G sets. The reason for this is that as the torque has been assumed to be constant throughout the speed range, the current in the windings is constant throughout the range, and increased output of the traction motors is obtained by virtue of merely the increase in the speed of rotation. All that is necessary in extra design considerations is to adapt the construction of the traction motors to the higher maximum speed, which, in the example given herein, is 1500 R. P. M.

The transition of the traction motors from operation at 90 cycles with one winding short-circuited, to the same speed of rotation but operating with energy of the frequency of the supply system on the primary windings, it made by disconnecting the first half of the traction motors 4A, 5A, 4B, 5B from the synchronous machines 16A, 16B by opening the secondary switches 82A, 82B, and also from the short-circuit connection by opening the short-circuiting switches 88A, 88B. The frequency of the synchronous machine is then changed from 90 cycles to 30 cycles by reversing the wound rotor induction machines 28A, 28B by opening the rheostats 77A, 77B and also the primary switch 75, then closing the switch 76 for reverse phase rotation and cutting out the resistance in the secondary circuits by means of the rheostats 77A, 77B. Thus, by "plugging" the wound motor machines, they quickly decelerate, reverse, and accelerate to 1200 R. P. M. in the reverse direction, carrying with them the rotors of the respective synchronous machines. After this reversal, the relative speed between rotor and frame members becomes 600 minus 1200 R. P. M. or —600 R. P. M., which corresponds to 30 cycles but in reverse phase rotation. In order to maintain the phase rotation in the same direction as before, the other switches 83A, 83B are now used to connect the synchronous machines to the traction motors, the direction of power flow being unchanged.

The primary windings of the traction motors are connected to the primary bus 85 by closing the switches 86A, 86B.

However, the transition last explained would result in merely a change in circuits but no change in speed of the locomotive, a second switching change being necessary to connect for the next running speed. It is therefore preferable to combine these switching operations, as was done in connection with the previous transition.

Hence, during the reversal of the wound rotor machines 28A, 28B, the multi-speed machines 22A, 22B can be reconnected to their intermediate speed windings by opening the high speed switch 62 and closing the intermediate speed switch 61. The multi-speed machines then decelerate the frame members of the synchronous machines to 400 R. P. M. while the wound rotor machines reverse and accelerate the rotor members in the same direction as that of the frame members. After the traction motors are reconnected by closing the switches 83, 86, the frequency in the secondary circuits is established at approximately 30 cycles, whereby determining the relative speed between the members of the synchronous machines at approximately 600 R. P. M. As the multi-speed machines are now connected for 400 R. P. M., the speed of the wound rotor machines 28 must then be about 1000 R. P. M. By reducing the resistance in the rheostats 77A, 77B, the first group of traction motors 4A, 5A, 4B, 5B will then assume load and hence hold the tractive effort of the locomotive while a similar transition is made on the second group of machines.

After the second half of the transition is accomplished, its wound rotor machines 28C, 28D are likewise running at approximately 1000 R. P. M. in reverse direction, switch 102 being closed, with resistance in their rotor circuits, the multi-speed machines 22C, 22D are running at 400 R. P. M. connected by the intermediate speed switch 95, and the traction motors 4C, 4D, 5C, 5D are connected to the synchronous machines 16C, 16D by switches 83C, 83D, and to the primary bus by switches 86C, 86D.

Now the locomotive can be accelerated to its tenth operating speed by adjustably cutting resistance out of all of the rheostats 77 simultaneously, thereby bringing the wound rotor machines 28 from 1000 to 1200 R. P. M. approximately, the frequency of the synchronous machine increasing from 30 to 40 cycles.

Thus the traction motors are now operating at a supersynchronous speed of 66.6% higher than synchronous speed, or in the case of 12-pole machines, 1000 R. P. M. Power from the bus is supplied to the primary windings of the traction motors at 60 cycles and power converted by the frequency converter M-G sets 14 from 60 to 40 cycles, flows into their secondary windings. In the M-G sets themselves, power flows from the bus 44' to the wound rotor machines 28 to drive the synchronous machines 16 as generators and also the multi-speed machines 22 as generators, returning power to the bus 44'.

The remainder of the speed range consisting of the eleventh to the fifteenth steps, is practically repetition of the fifth to the ninth steps respectively, inasmuch as the switching changes effect an increase in frequency of the energy flowing from the synchronous machine to the traction motors from 40 to 90 cycles. The speed of the multi-speed machines is successively 200 R. P. M.; 0 R. P. M. (locked rotor); 200 R. P. M. in the opposite direction or that direction of rotation in which they operated originally in steps 1 to 5; then 400 R. P. M.; and lastly, 600 R. P. M. At each reconnection the speed of the wound rotor machines drops to 1000 R. P. M. which at each operating speed, is increased to approximately 1200 R. P. M.

At the maximum speed of the locomotive, which is the fifteenth economical operating speed, the multi-speed induction machines 22 drive the frame members 21 of the synchronous machines 16 at 600 R. P. M. in one direction of rotation and the wound rotor induction machines 28 drive the rotor members at 1200 R. P. M. in the opposite direction of rotation, effecting a relative speed of 1800 R. P. M. between the two members. As the synchronous machines have 6 poles, this speed results in a generated frequency of 90 cycles, at which frequency, power is supplied to the secondary windings of the traction motors. With power at 60 cycles being supplied to the primary windings the traction motors therefore run at 250% of their 60 cycle synchronous speed, or in the case of 12 pole motors, the speed thereof is 1500 R. P. M.

Following is a table showing the speeds of the various machines involved at each operating speed of the locomotive and at each reconnection prior to acceleration from one sped to the next higher operating speed. The frequency of the energy flowing in the primary windings and in the secondary windings of the traction motors is also shown for each condition.

*15-speed locomotive—motoring*

| Locomotive speeds | | Speeds of machines of frequency converter M-G sets (R. P. M.) | | | Frequency | |
|---|---|---|---|---|---|---|
| Point | Percent | Multi-speed machine and frame of synch. mach. | Wound rotor machine and rotor of synch. mach. | Synch. mach. relative speed | Cycles primary | Cycles secondary |
| 0 | 0 | 0 | +1200 | 1200 | 60 | 60 |
|   |   | +200 | +1400 | 1200 | 60 | 60 |
| 1 | 6.7 | +200 | +1200 | 1000 | 60 | 50 |
|   |   | +400 | +1400 | 1000 | 60 | 50 |
| 2 | 13.3 | +400 | +1200 | 800 | 60 | 40 |
|   |   | +600 | +1400 | 800 | 60 | 40 |
| 3 | 20 | +600 | +1200 | 600 | 60 | 30 |
|   |   | +400 | +1000 | 600 | 0 | 30 |
| 4 | 26.7 | +400 | +1200 | 800 | 0 | 40 |
|   |   | +200 | +1000 | 800 | 0 | 40 |
| 5 | 33.3 | +200 | +1200 | 1000 | 0 | 50 |
|   |   | 0 | +1000 | 1000 | 0 | 50 |
| 6 | 40 | 0 | +1200 | 1200 | 0 | 60 |
|   |   | −200 | +1000 | 1200 | 0 | 60 |
| 7 | 46.7 | −200 | +1200 | 1400 | 0 | 70 |
|   |   | −400 | +1000 | 1400 | 0 | 70 |
| 8 | 53.3 | −400 | +1200 | 1600 | 0 | 80 |
|   |   | −600 | +1000 | 1600 | 0 | 80 |
| 9 | 60 | −600 | +1200 | 1800 | 0 | 90 |
|   |   | −400 | −1000 | 600 | 60 | 30 |
| 10 | 66.7 | −400 | −1200 | 800 | 60 | 40 |
|   |   | −200 | −1000 | 800 | 60 | 40 |
| 11 | 73.3 | −200 | −1200 | 1000 | 60 | 50 |
|   |   | 0 | −1000 | 1000 | 60 | 50 |
| 12 | 80 | 0 | −1200 | 1200 | 60 | 60 |
|   |   | +200 | −1000 | 1200 | 60 | 60 |
| 13 | 86.7 | +200 | −1200 | 1400 | 60 | 70 |
|   |   | +400 | −1000 | 1400 | 60 | 70 |
| 14 | 93.3 | +400 | −1200 | 1600 | 60 | 80 |
|   |   | +600 | −1000 | 1600 | 60 | 80 |
| 15 | 100 | +600 | −1200 | 1800 | 60 | 90 |

It is to be understood that other speed combinations are to be contemplated for various operating conditions. For example, if a two-speed single winding induction machine having speeds of 600 and 300 R. P. M. be substituted for the 600, 400, 200 R. P. M. machine, there will be available 10 evenly spaced economical running speeds instead of 15. Furthermore, by providing the various machines with suitable numbers of poles, the system can be adapted for other frequencies, such as 50 cycles or 25 cycles.

When operating at any of the economical running speeds, the characteristics of the system are such that the speed of the locomotive is substantially constant, independent of load, and substantially independent of whether the locomotive is motoring or regenerating. When an up-grade is encountered, the speed of the locomotive decreases only to the extent of the increase in slip of the induction type machines in the system, while if the locomotive encounters a down-grade, the locomotive speeds up only to the extent that the slips of the induction type machines change from one side of synchronism to the other.

Furthermore, the control system can be used to decelerate, as well as to accelerate the locomotive. The method of control is similar to acceleration. In the embodiment described, assume the locomotive to be operating at its maximum on the fifteenth step. To decelerate, the rheostats 77A, 77B are set in the open position on the first half of the machines, the multi-speed machines are then switched from high to intermediate speed by opening their high speed switch 62 and closing the intermediate speed switch 61. As the multi-speed machines decelerate from 600 R. P. M. to 400 R. P. M., the wound rotor machines 28A, 28B accelerate to approximately 1400 R. P. M. as the relative speed between rotor and frame remains substantially 1800 R. P. M. Enough resistance is then inserted into the secondary windings by the rheostats 77A, 77B, so that the first group of traction motors exert a torque which holds the torque of the locomotive to prevent it from accelerating if running on a downgrade, while the other group of motors is reconnected. Then, as all rheostats 77 are cut out simultaneously but gradually, the speed of the wound rotor machines 28 is decreased from 1400 to 1200 R. P. M. at which speed the frequency in the synchronous machine windings has decreased to 80 cycles from 90 cycles, and the locomotive has decreased its speed from 100% to 93.3%.

Control under deceleration is carried out in a manner similar to the method described for acceleration. The frequency of the energy flowing to the armature winding of the synchronous machine is decreased, step by step, to substantially half the frequency of the power supply, or 30 cycles, during which time power is also returned to the power system from the primary windings of the traction motors which are operating as induction generators. Then one group of motors is disconnected, the frequency of the energy generated by the synchronous machines is adjusted to a value substantially fifty per cent higher than the frequency of the power system, and the primary windings of the traction motors are short-circuited. The motors then regenerate power at 90 cycles, in this example, and hold the braking effort while the other group of motors is reconnected. The frequency of the generated energy is then adjustably decreased to half the frequency of the power system or 30 cycles. Again, one group of motors is disconnected, their primary windings connected to the power supply system and their secondary windings reconnected to the synchronous machine in reversed phase rotation, the frequency of the synchronous machine being adjusted, generally speaking, to a value equal to the frequency of the supply system minus the frequency to which the energy flowing from the secondary windings, during the previous decelerating operation, was decreased. In the present example, however, the connection between the secondary windings of the traction motors and the synchronous machines need only be reversed by means of the reversing switches 82, 83.

On the last decelerating operation, power is regenerated by the traction motors and returned to the system from the primary windings but energy must now be supplied to the secondary windings from the synchronous machines 16, operating now as generators, the frequency of the last-mentioned energy, being adjustably increased from 30 cycles to 60 cycles or power system frequency, at which frequency the traction motors are at rest.

From the following table of speeds and frequencies, the details of the switching changes will be made clear to those skilled in the art in view of the detailed explanation in connection with the accelerating operations. It is to be noted that on the last decelerating step from 6.3% speed to zero, the multi-speed machines 22 are energized with direct current by closing the switch 69, 99, thereby holding the frame member 21 of the synchronous machine 16 substantially stationary during this last step.

*15-speed locomotive—regenerating*

| Locomotive speeds | | Speed of machines of frequency converter M-G sets (R. P. M.) | | Frequency | |
|---|---|---|---|---|---|
| Point | Percent | Multi-speed machine and frame of synch. mach. | Wound rotor machine and rotor of synch. mach. | Synch. mach. relative speed | Cycles primary | Cycles secondary |
| 15 | 100 | +600 | −1200 | 1800 | 60 | 90 |
|  |  | +400 | −1400 | 1800 | 60 | 90 |
| 14 | 93.3 | +400 | −1200 | 1600 | 60 | 80 |
|  |  | +200 | −1400 | 1600 | 60 | 80 |
| 13 | 86.7 | +200 | −1200 | 1400 | 60 | 70 |
|  |  | 0 | −1400 | 1400 | 60 | 70 |
| 12 | 80 | 0 | −1200 | 1200 | 60 | 60 |
|  |  | −200 | −1400 | 1200 | 60 | 60 |
| 11 | 73.3 | −200 | −1200 | 1000 | 60 | 50 |
|  |  | −400 | −1400 | 1000 | 60 | 50 |
| 10 | 66.7 | −400 | −1200 | 800 | 60 | 40 |
|  |  | −600 | −1400 | 800 | 60 | 40 |
| 9 | 60 | −600 | −1200 | 600 | 60 | 30 |
|  |  | −400 | +1400 | 1800 | 0 | 90 |
| 8 | 53.3 | −400 | +1200 | 1600 | 0 | 80 |
|  |  | −200 | +1400 | 1600 | 0 | 80 |
| 7 | 46.7 | −200 | +1200 | 1400 | 0 | 70 |
|  |  | 0 | +1400 | 1400 | 0 | 70 |
| 6 | 40 | 0 | +1200 | 1200 | 0 | 60 |
|  |  | +200 | +1400 | 1200 | 0 | 60 |
| 5 | 33.3 | +200 | +1200 | 1000 | 0 | 50 |
|  |  | +400 | +1400 | 1000 | 0 | 50 |
| 4 | 26.7 | +400 | +1200 | 800 | 0 | 40 |
|  |  | +600 | +1400 | 800 | 0 | 40 |
| 3 | 20 | +600 | +1200 | 600 | 0 | 30 |
|  |  | +400 | +1000 | 600 | 60 | 30 |
| 2 | 13.3 | +400 | +1200 | 800 | 60 | 40 |
|  |  | +200 | +1000 | 800 | 60 | 40 |
| 1 | 6.7 | +200 | +1200 | 1000 | 60 | 50 |
|  |  | 0 | +1000 | 1000 | 60 | 50 |
| 0 | 0 | 0 | +1200 | 1200 | 60 | 60 |

To start the locomotive in the opposite or reverse direction of motion, the phase rotation on the primary bus 85 and the M-G set bus 44' are reversed by opening the bus switches 90, 90' and closing the switches 89, 89'. The only immediate effect of this switching operation is the reversal of the wound rotor machines 28 as the multi-speed machines 22 are stationary when the locomotive is stationary. It is desirable to insert some resistance into the rheostats 77 to "cushion" the surge of current into these motors when they are thus reversed.

Control during operation in the reverse direction from this point on is no different than by the method described hereinbefore.

Inasmuch as the speed of the locomotive is always substantially constant for each connection, if the power supply to the locomotive fails momentarily during operation it is not necessary to bring the locomotive to rest in order to reconnect the machines for operation, but the locomotive may coast along until the power is restored, the secondary reversing switches 82, 83 being held open. Then when the power is restored, it is necessary to merely determine the actual speed of the locomotive by speedometer or other suitable means, reconnect the machines of the M-G sets with resistance inserted in the rheostats 77 for the speed connection which corresponds nearest to the actual speed, and close the proper secondary switches. Any discrepancy in speed will cause the wound rotor machines 28 to change speed, the rheostats 77 acting to cushion the surge of current due to the discrepancy in speed. The rheostats can then be adjusted to cut out the resistance, thereby accelerating or decelerating to the said nearest operating speed.

Figure 4:
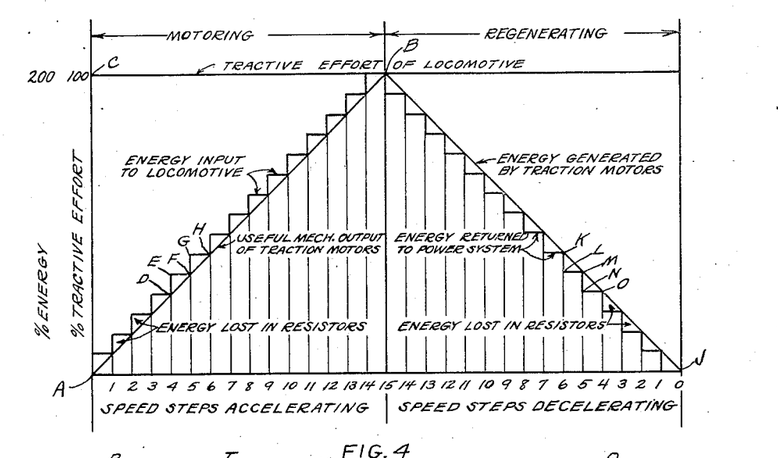
Figure 4 is a set of curves showing the distribution of power during acceleration and regenerative deceleration.

Referring now to Figure 4, the power output of the locomotive during acceleration is indicated by the straight lines AB, corresponding to a constant torque over the entire speed range, as shown by the line CB. The power dissipated in the rheostats 77 in accelerating from each point to the next, is indicated by the series of small triangles DEF, FGH, etc. Hence, the energy input to the locomotive (neglecting machine losses) is equal to the output plus the resistor loss and is therefore indicated by the outline of the series of steps DEFGH, etc. from A to B. The curve is based on the assumption that when the locomotive delivers maximum tractive effort, the machines temporarily are subjected to double load.

The maximum value of power dissipated in resistors at maximum tractive effort is only one-fifteenth of the power input at maximum speed and maximum tractive effort.

During deceleration by regeneration, assuming the same constant torque on the motors, the energy generated by the traction motors is indicated by the straight line BJ. This power is returned to the system with the exception of machine losses (neglected) and the losses in resistors, indicated by the triangles KLM, MNO, etc. Therefore, the power regenerated back to the bus is indicated by the stepped curve KLMNO, etc. from B to J.

Although, as has been previously explained, the traction motors 4, 5 and frequency converter M-G sets 14 have a constant torque characteristic from zero speed to maximum speed of the locomotive, it is evident from the curves in Figure 4 that if this constant torque is maintained to give a constant tractive effort at all speeds, the power input increases in proportion to the speed, therefore the transformer 41 and the phase converter 30 must have sufficient capacity to transform the maximum power input and the converter 30 must have the capacity to convert it to three phase power. In practice, however, many if not most locomotive applications do not require that the maximum tractive effort be maintained up to full speed, and very few locomotives are capable of so maintaining their tractive effort.

In such an application therefore it is possible to reduce the capacity and therefore the weight and cost of the transformer and phase converter of a locomotive of the type disclosed herein, to a capacity which allows full tractive effort up to a predetermined locomotive speed with a constant horsepower characteristic above that speed.

Figure 5:
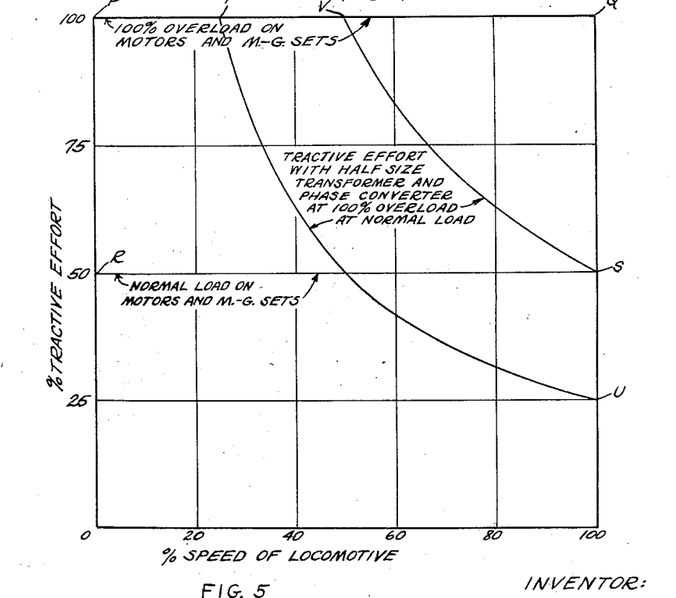
Figure 5 is a set of curves showing the speed-tractive effort characteristics of the locomotive.

Figure 5 illustrates this principle. The line PQ is the constant tractive effort based on 100% overload on the traction motors, transformer, and phase converter during acceleration, maintained up to full speed, while the constant tractive effort based on normal loading is shown by the line RS, or 50% of the maximum tractive effort. If the transformer and phase converter be reduced to one-half the size necessary to maintain the tractive effort curve PQ, the maximum tractive effort will be that indicated by the line PV up to half speed and then along the constant horsepower curve VS. The tractive effort curve corresponding to normal load on the transformer and phase converter in this case is shown by the curve PTU.

I do not intend my invention to be limited to the details shown and described herein, except as they are recited as essential in the appended claims.

I claim:

1. Apparatus for controlling the speed of an electric locomotive having a plurality of driving axles, comprising in combination an A. C. motor connected to each of said axles, a source of alternating current, a plurality of adjustable ratio frequency converters adapted for electrical connection to said motors and switching means co-operative with said converters, for controlling the frequency of the energy supplied to said motors, said switching means being adapted for successively switching less than all of said converters at a time, thereby maintaining torque on at least one of said axles during the switching operations.

2. In a vehicle having a plurality of driving axles, a set of induction motors connected to each of said axles, a source of alternating current, an adjustable ratio frequency converter individual to each of said sets of motors for converting power flowing between said source at constant frequency and said motors at adjustable frequency, and switching means co-operative with said converters, for controlling the ratio of frequency conversion, said switching means being adapted for successively switching approximately one-half of the converters at a time, thereby maintaining torque on approximately one-half of the driving axles during the switching operation.

3. In an electric locomotive having a plurality of driving axles, a wound rotor type induction motor connected to each of said driving axles, each of said motors having a primary winding and a secondary winding, a source of alternating current, means for connecting the primary winding of each of said motors to said source, an adjustable ratio frequency converter for each of said motors, said converters being connected between said source and said secondary windings respectively, and switching means co-operative with said converters for controlling the frequency of the energy interchanged between said source and said secondary windings, said switching means being adapted for successively switching part of said converters at a time, while the remaining converters maintain torque on at least part of said axles during the switching operations.

4. The method of accelerating a wound rotor type induction machine from zero speed, through its normal synchronous speed to a predetermined supersynchronous speed, comprising supplying energy from a constant frequency source to the primary winding of said machine and adjustably reducing the frequency of the energy flowing from the secondary winding to a predetermined value, then short circuiting one of said windings and adjustably increasing the frequency of the energy input to the other of said windings to a value higher than said constant frequency, then again supplying energy from said source to the primary winding and supplying energy at adjustable frequency to the secondary winding, and adjusting the latter frequency to obtain the predetermined supersynchronous speed.

5. The method of accelerating a wound rotor type induction machine from zero speed to a predetermined supersynchronous speed, comprising supplying alternating current from a constant frequency source to the primary winding of said machine and adjustably reducing the frequency of the energy flowing from the secondary winding to a predetermined minimum value, thereby accelerating said machine to a corresponding subsynchronous speed, then with the primary winding short-circuited, supplying alternating current to the secondary winding at a frequency which is substantially equal to that of said constant frequency source minus said minimum value, then increasing the frequency in said secondary winding to a predetermined maximum value which is substantially higher than that of said source, then again supplying energy from said source at constant frequency to the primary winding and supplying alternating current to the secondary winding at a frequency which is substantially equal to said maximum value minus the frequency of said source, and lastly, increasing the frequency in the secondary winding to attain said predetermined supersynchronous speed.

6. The method of accelerating a wound rotor type induction machine from zero speed to a predetermined supersynchronous speed, comprising supplying energy from a constant frequency source to the primary winding of said machine and adjustably reducing the frequency of the energy flowing from the secondary winding to substantially half the frequency of said source, thereby accelerating said machine to substantially half of its synchronous speed, then with one of said windings short-circuited, supplying alternating current to the other winding at substantially half the frequency of said source, then increasing the frequency of the last-mentioned energy to a value which is substantially fifty per cent higher than that of said source, then again supplying energy from said source at constant frequency to said primary winding and supplying energy to said secondary winding at a frequency equal to substantially half that of said source, and finally increasing the frequency of the energy in said secondary winding to accelerate said machine to said predetermined supersynchronous speed.

7. The method of decelerating a wound rotor type induction machine connected to a power system, from a supersynchronous speed down to standstill, comprising adjustably reducing the frequency of the energy flowing from the secondary winding of the machine to substantially half the frequency of the power system, the power output of the primary winding of said machine being returned to said system, then disconnecting and short-circuiting the primary winding and adjustably reducing the frequency of the energy flowing from the secondary winding from a value substantially fifty per cent higher than that of said power system to a value substantially one-half of the frequency of the power system, then reconnecting the primary winding to the power system, supplying energy to the secondary winding at half the frequency of the power system and finally increasing the frequency of the last-mentioned energy to a value equal to that of the power system.

8. The method of accelerating a plurality of wound rotor type induction machine connected to a common load, to a predetermined supersynchronous speed, without interrupting the torque exerted against said load, comprising supplying energy from a constant frequency source to the primary windings of said machines and adjustably reducing the frequency of the energy flowing from the secondary windings to half the frequency of said source, then disconnecting a number less than all of the machines, short-circuiting their primary windings respectively, and supplying energy to their secondary windings at half the frequency of said source, then repeating the three last-mentioned steps successively on the remainder of the machines, then adjustably increasing the frequency to a value substantially higher than that of said source, then again disconnecting a number less than all of the machines, supplying energy to the secondary windings thereof at a frequency equal to said higher value of frequency minus that of said source, and supplying energy to the primary windings from said source, then repeating the three last-mentioned steps successively on the remainder of the machines, and finally adjusting the frequency of the energy supplied to the secondary windings to adjust the speed of said machines to said predetermined supersynchronous speed.

9. The method of decelerating a plurality of wound rotor type induction machines mechanically connected to a common rolling load and electrically connected to a power system, from a supersynchronous speed down to standstill without interrupting the braking torque exerted against the load, comprising adjustably decreasing the frequency of the energy flowing from the secondary windings of the machines to substantially half the frequency of the power system, the power output of the primary windings being returned to said system, then disconnecting and short circuiting the primary windings of a number less than all of the machines, receiving power from the secondary windings thereof at a frequency substantially fifty per cent higher than that of the system, then disconnecting and short-circuiting the primary windings of the remainder of the machines, then adjustably reducing the frequency of the power flowing from the secondary windings of all the machines to a value substantially half that of the power system, then reconnecting the primary windings of a number less than all of the machines to the power system and supplying energy to the secondary windings thereof at substantially half the frequency of the power system, then repeating the two last-mentioned steps on the remainder of the machines, and finally increasing the frequency of the energy input to the secondary windings to a value equal to that of the power system.

10. The method of starting and accelerating an induction machine having a primary winding and a secondary winding, by means of an auxiliary machine connected to said secondary winding by an electric circuit, said auxiliary machine being adapted for adjusting the frequency of the energy flowing in said circuit, wherein the maximum torque which can be exerted by said induction machine varies over a greater range, with variations in the frequency of the energy in said circuit below a predetermined value of frequency, than for equal variations in frequency above said predetermined value, said method comprising supplying electric energy at constant frequency to said primary winding, adjustably decreasing the frequency of the energy in said circuit from the frequency of said supply to said predetermined value, then disconnecting said primary winding from the constant frequency source of energy, adjusting the frequency of the energy in said electric circuit to the proper value and reversing the phase rotation of the energy in said secondary winding, short-circuiting said primary winding, and finally increasing the frequency of the energy in said circuit to the desired value.

11. The method of starting and accelerating an induction machine having a primary winding and a secondary winding, by means of an auxiliary machine connected to said secondary winding by an electric circuit, said auxiliary machine being adapted for adjusting the frequency of the energy flowing in said circuit, wherein the maximum torque which can be exerted by said induction machine decreases at a greater rate when the frequency of the energy in said circuit decreases below half the rated frequency of said induction machine than when a similar decrease in frequency is made within a range above said half frequency, said method comprising supplying energy at said rated frequency to said primary windings, adjustably decreasing the frequency of the energy to half of said rated value, then disconnecting the primary winding from the source of supply, reversing the phase rotation of the voltage impressed on said secondary winding and short-circuiting said primary winding, and finally increasing the frequency of the energy in said secondary winding to any suitable value.

12. A system of adjustable speed control, comprising in combination, a supply of alternating current, a main induction machine having a primary winding and a secondary winding, means connected to one of said windings for interchanging energy between the last-said winding at adjustable frequency and said supply at constant frequency, control means for adjusting the frequency of the energy in the last-said winding, switching means for selectively connecting the other of said windings to said supply during operation within a part of the speed range of said machine, and means for selectively short-circuiting the last-said winding during operation within another part of said speed range.

13. An adjustable speed drive, comprising in combination, a supply of alternating current, a load shaft, a main induction machine coupled thereto, said machine having a primary winding and a secondary winding, means comprising a synchronous machine electrically connected to said secondary winding for adjusting the frequency of the energy flowing in said secondary winding, and switching means for selectively either connecting said primary winding to said supply or short-circuiting the last said winding.

14. An adjustable speed drive, comprising in combination, a supply of alternating current, a load shaft, a main induction machine coupled thereto, said machine having a primary winding and a secondary winding, a synchronous machine having a winding, means for connecting the last said winding in series with said secondary winding, means coupled to said synchronous machine, for adjusting the frequency of the energy flowing in said series connected windings over a range which extends both above and below the frequency of said supply, and switching means for selectively either connecting said primary winding to said supply or short-circuiting the last said winding.

15. An adjustable speed drive, comprising in combination, a supply of alternating current, a load shaft, a main induction machine coupled thereto, said machine having a primary winding and a secondary winding, a synchronous machine having an armature winding, means for connecting said armature winding in series with said secondary winding, means coupled to said synchronous machine, for adjusting the speed of said machine and hence the frequency of the energy flowing in said series connected windings over a range which extends from substantially half the frequency of said supply to a maximum value appreciably higher than the frequency of said supply, switching means for selectively connecting said primary winding to said supply for starting said main machine and accelerating it to half synchronous speed, by adjustably reducing the frequency in said series connected windings from a value equal to that of said supply, to half said value, and switching means for selectively short-circuiting said primary winding and for reversing the relative phase rotations in said series connected windings, whereby said main machine can be further accelerated to a speed appreciably higher than its rated synchronous speed by increasing the frequency in said series connected windings to said maximum value, and whereby said main machine can be operated over a further range of supersynchronous speeds when said primary winding is again connected to said supply.

16. An adjustable speed drive, comprising in combination, a supply of alternating current, a load shaft, a main induction machine coupled thereto, said machine having a primary winding and a secondary winding, a synchronous machine having an armature winding, said synchronous machine having a rotor member and a frame member, each of said members being rotatably mounted on bearings, means for selectively operating one of said members at a plurality of substantially constant speeds, means for adjustably controlling the speed of the other of said members over a range equal to at least the difference between said constant speeds, for adjusting the frequency of the energy flowing in said armature winding, switching means for connecting said armature winding in series with said secondary winding, and switching means for selectively either connecting said primary winding to said supply or short-circuiting the last said winding.

17. An adjustable speed drive, comprising in combination, a supply of alternating current at constant frequency, a main induction machine having a primary winding and a secondary winding, switching means for optionally connecting said primary winding to said supply or short circuiting said primary winding, and means for supplying alternating current at adjustable frequency to said secondary winding selectively in either direction of phase rotation.

18. An adjustable speed drive, comprising in combination, a supply of alternating current at constant frequency, a main induction machine having a primary winding and a secondary winding, switching means for optionally connecting said primary winding to said supply or short circuiting said primary winding, means providing a source of alternating current at frequencies adjustable over a range which extends both above and below the frequency of said supply, and switching means for connecting said adjustable frequency source to said secondary winding selectively in either direction of phase rotation.

19. An adjustable speed drive, comprising in combination, a main induction machine having a primary winding and a secondary winding, an adjustable frequency machine having an armature winding, switching means for connecting said armature winding in series with said secondary winding in either direction of phase rotation, said adjustable frequency machine having a rotor member and a frame member, each of said members being rotatably mounted on bearings, a multi-speed squirrel cage machine coupled to one of said members, a wound rotor induction machine coupled to the other of said members, switching control means for controlling the speeds of each of said last named induction machines, a source of alternating current, and switching means for selectively either connecting said primary winding to said source or short circuiting said winding.

ALLEN M. ROSSMAN.